United States Patent
Angaiah et al.

(10) Patent No.: US 6,485,699 B2
(45) Date of Patent: Nov. 26, 2002

(54) PROCESS FOR THE PREPARATION OF OLIVINE LITHIUM NICKEL PHOSPHATE COMPOSITE

(75) Inventors: Subramanian Angaiah, Tamil Nadu (IN); Vasudevan Thiagarajan, Tamil Nadu (IN); Gangadharan Ramaiyer, Tamil Nadu (IN); Mani Ariyanan, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/820,275

(22) Filed: Mar. 28, 2001

(65) Prior Publication Data

US 2002/0141928 A1 Oct. 3, 2002

(51) Int. Cl.[7] ............................................... C01B 15/16
(52) U.S. Cl. .................................................... 423/306
(58) Field of Search ............................. 423/179.5, 306, 423/312

(56) References Cited

U.S. PATENT DOCUMENTS 5,910,382 A * 6/1999 Goodenough et al. ... 429/218.1

* cited by examiner

Primary Examiner—Stanley S. Silverman
Assistant Examiner—Maribel Medina
(74) Attorney, Agent, or Firm—Ladas & Parry

(57) ABSTRACT

The present invention describes a process for the production of olivine lithium nickel phosphate composite by uniformly mixing oxides of Ni and P with $Li_2CO_3$, converting the mixture to a paste by adding glycerol, calcining the paste continuously to obtain the desired composite.

5 Claims, 1 Drawing Sheet

X-ray diffraction paten of $LiNiPO_4$

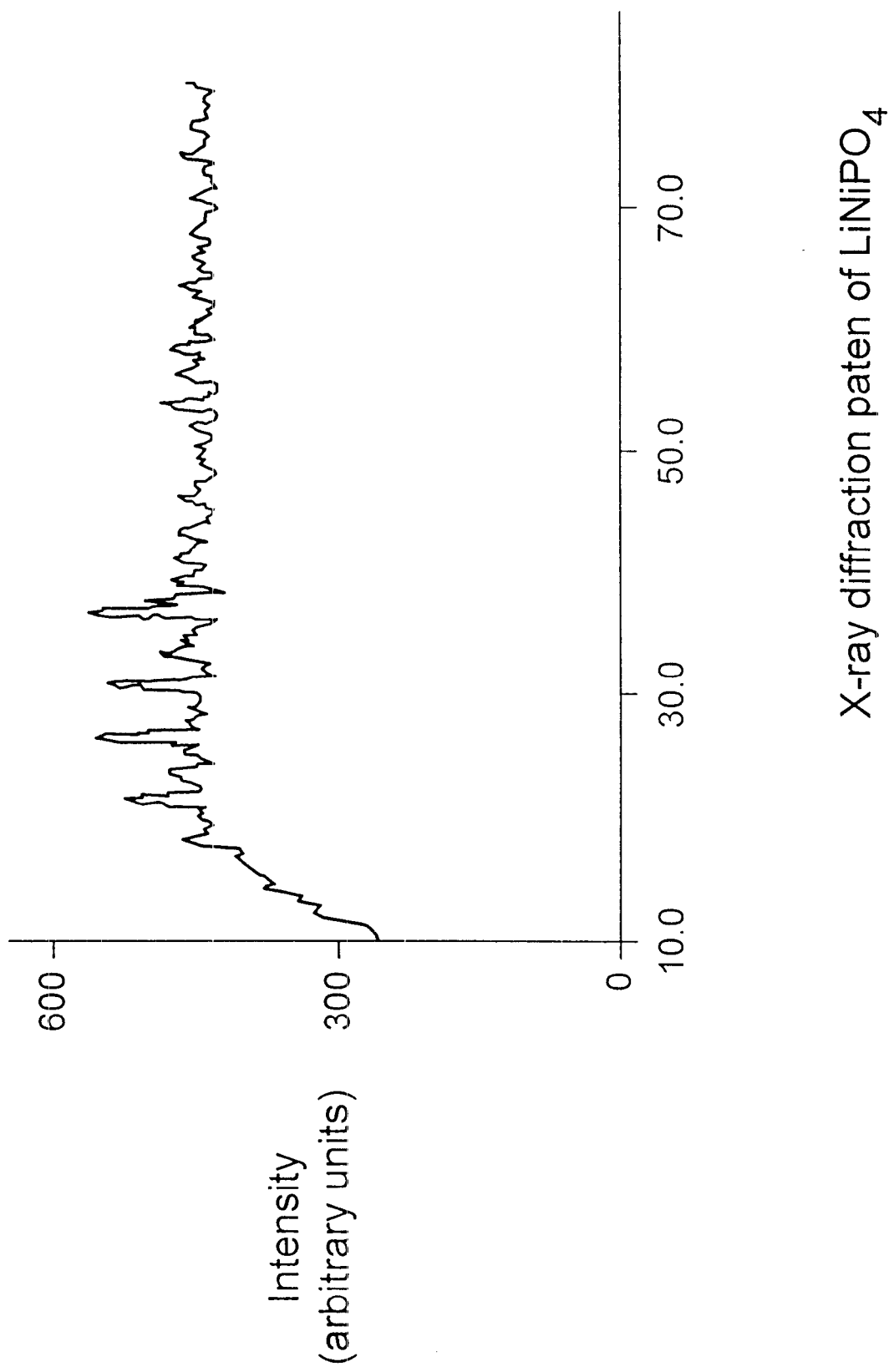

PROCESS FOR THE PREPARATION OF OLIVINE LITHIUM NICKEL PHOSPHATE COMPOSITE

FIELD OF THE INVENTION

The present invention relates to a process for the preparation of olivine lithium nickel phosphate ($LiNiPO_4$) composite, which is very useful for high voltage lithium reversible cells. $LiNiPO_4$ is a reversible cathode material useful for high voltage cells of lithium in non-aqueous media.

BACKGROUND OF THE INVENTION

In all the procedures available in the literature several disadvantages are observed:
1. Phase impurity
2. Longer duration of thermal preparation
3. High temperature of operation
4. pH control
5. Several steps of preparation

OBJECTS OF THE INVENTION

The main object of this invention is to synthesis olivine $LiNiPO_4$ under suitable solid state reaction method which obviates the defects and draw backs hither to known in other methods of preparation of this compound from already known procedures in literatures.

BRIEF DESCRIPTION OF THE ACCOMPANYING DRAWINGS

The Figure shows the X rays analysis confirming the formation of $LiNiPO_4$.

SUMMARY OF THE INVENTION

Accordingly the present invention provides a process for the preparation of olivine lithium nickel phosphate composite said process comprising, uniformly mixing oxides of Ni and P with $Li_2CO_3$, converting the mixture to a paste by adding glycerol, calcining the paste so obtained at 750° C. continuously for 12 hours to obtain the desired composite.

In one embodiment of the invention, the oxide of phosphorous is $P_2O_5$.

In a further embodiment of the invention, the nickel oxide is NiO.

In another embodiment of the invention, the calcination is done in a furnace.

DETAILED DESCRIPTION OF THE INVENTION

The prepared product was subjected to x-ray analysis. The product was found to be in single phase. Olivine lithium nickel phosphate composite is prepared by mixing oxides of nickel phosphorous with lithium carbonate and heating together all in solid state condition.

The cathode material is synthesised for a secondary battery, by heating a paste prepared by mixing fine particles of $Li_2CO_3$, $P_2O_4$ and NiO in glycerol. This paste was initially heated slowly in a furnaco to evaporate off glycerol in order to get a dried mass at 250° C. This dried masss was then continuously heated to 750° C. for 12 hrs. The compound formed was slowly cooled to room temperature and was ground well and then examined for its particle size, colour and XRD exposure. It was found that the prepared sample was purple in colour and was homogenous. X-rays analysis confirmed the formation of $LiNiPO_4$ according to the Figure.

EXAMPLE-1

$Li_2CO_3$, NiO and $P_2O_5$ in the molar ratio of 1:1:1 (0.74 gm; 1.49 gm and 1.42 gm respectively) were mixed slowly in glycerol binder (2 ml). Flux (urea in an amount of 2.402 gm) was added slowly under heating up to a temperature of 800° C. for a period of upto 10 hours. The mixture was then cooled to room temperature and the residue subjected to XRD exposure. The purple coloured product continued the production of olivine lithium nickel phosphate ($LiNiPO_4$) composite. The efficiency of the reaction was 90% and the product was obtained in a single phase. Single electrode potential of $LiNiPO_4$ with respect to Li in 1M $LiCiO_4$ in propylene carbonate was 2.99 v.

EXAMPLE-2

$Li_2CO_3$, NiO and $P_2O_5$ in the molar ratio of 1·1·1 (0.74 gm; 1.49 gm and 1.42 gm respectively) were mixed slowly in glycerol binder (3 ml). Flux (urea in an amount of 2.402 gm) was added slowly under heating up to a temperature of 600° C. for a period of upto 12 hours. The mixture was then cooled to room temperature and the residue subjected to XRD exposure. The purple coloured product confirmed the production of olivine lithium nickel phosphate ($LiNiPO_4$) composite. The efficiency of the reaction was 90% and the product was obtained in single phase Single electrode potential of $LiNiPO_4$ with respect to Li in 1M $LiCiO_4$ in propylene carbonate was 2.99 v.

ADVANTAGES OF THE INVENTION ARE

1. Fine particles of the reactants viz, $Li_2CO_3$, NiO and $P_2O_5$ were bound by glycerol and made the mixture into a paste uniform reaction during heating.

2. Glycerol is used as a binder for the inorganic solid state reactants

3. The product $LiNiPO_4$ is obtained in a single phase component free from impurities as evidenced by x-ray analysis.

4. All the reactants react uniformly leaving unreacted initial reactant components.

5. Addition of glycerol as a binder has no influence in the formation of the final procduct.

6. A uniform homogeneous mixture of oxides of phosphorous ($P_2O_3$) and nickel with $Li_2CO_5$ were made into a paste to get a product of high purity.

7. Glycerol used as a solvent for binding the oxides viz phosphorous and nickel with $Li_2CO_3$ for making a paste of required consistency also enhanced the product of fine particles.

8. The addition of a flux (urea) and excess addition of glycerol (solvent) as a binding material for oxides does not change the colour or quality of the end product.

We claim:

1. A process for the production of olivine lithium nickel phosphate composite, said process comprising uniformly mixing oxides of Ni and P with $Li_2CO_3$, converting the mixture to a paste by adding glycerol, calcining the paste so obtained to a temperature of up to 800° C. continuously for a period of up to 12 hours to obtain the desired composite.

2. A process as claimed in claim 1 wherein the oxide of phosphorous is $P_2O_3$.

3. A process as claimed in claim 1 wherein the nickel oxide is NiO.

4. A process as claimed in claim 1 wherein the calcination is done in a furnace.

5. A process as claimed in claim 1 wherein urea is used as a flux.

* * * * *